（12） United States Patent
Hasegawa et al.

(10) Patent No.: US 9,694,437 B2
(45) Date of Patent: Jul. 4, 2017

(54) ONE-SIDE RESISTANCE SPOT WELDING METHOD AND APPARATUS FOR CARRYING OUT THE SAME

(71) Applicant: HONDA MOTOR CO., LTD., Tokyo (JP)

(72) Inventors: Eisaku Hasegawa, Tochigi (JP); Sumitomo Watanabe, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 605 days.

(21) Appl. No.: 14/100,437

(22) Filed: Dec. 9, 2013

(65) Prior Publication Data

US 2014/0158668 A1    Jun. 12, 2014

(30) Foreign Application Priority Data

Dec. 10, 2012 (JP) .................................. 2012-269370

(51) Int. Cl.
   *B23K 9/12*    (2006.01)
   *B23K 11/11*   (2006.01)
   *B23K 11/30*   (2006.01)

(52) U.S. Cl.
   CPC ........... *B23K 11/11* (2013.01); *B23K 11/3009* (2013.01)

(58) Field of Classification Search
   CPC ........................... B23K 11/11; B23K 11/3009
   USPC ....... 219/86.9, 91.22, 108, 87, 86.25, 86.31, 219/86.33, 119, 120, 56.1, 91.23, 91.2, 92
   See application file for complete search history.

(56) References Cited

U.S. PATENT DOCUMENTS 2,137,909 A * 11/1938 Hagedorn ............... B23K 11/11
                                                       219/86.9
3,462,577 A *  8/1969 Helms ................. B23K 11/256
                                                        219/110

(Continued)

FOREIGN PATENT DOCUMENTS

JP        02117779 A  *  5/1990
JP        02160180 A  *  6/1990

(Continued)

OTHER PUBLICATIONS

Japanese Office Action with partial English translation, dated May 12, 2015, 8 pages.

*Primary Examiner* — Dana Ross
*Assistant Examiner* — Ket D Dang
(74) *Attorney, Agent, or Firm* — Rankin, Hill & Clark LLP

(57) ABSTRACT

A one-side resistance spot welding method includes a preheating step followed by a welding step. In the preheating step, an electric current having a smaller current value than a welding current is fed from a first electrode to second electrodes such that a substantially annular high-temperature region coaxial with the first electrode and having a higher temperature than neighboring parts is created in a workpiece due to resistance heat generation at a position located near a tip end of the first electrode. In the welding step, the annular high-temperature region forms a shielded current path due to its high electric resistance and serves to guide a welding current from the first electrode to flow into a bottom steel sheet of the workpiece via the shielded current path, thereby allowing the welding current to subsequently advance along the bottom steel sheet and reach the second electrodes via a top steel sheet.

5 Claims, 5 Drawing Sheets

(56) References Cited

U.S. PATENT DOCUMENTS

| | | | | |
|---|---|---|---|---|
| 5,285,043 A | * | 2/1994 | Smith | B23K 11/312 |
| | | | | 219/87 |
| 2003/0222054 A1 | * | 12/2003 | Katou | B23K 11/11 |
| | | | | 219/86.9 |
| 2009/0011269 A1 | * | 1/2009 | Urushihara | B23K 11/115 |
| | | | | 428/594 |
| 2010/0243616 A1 | * | 9/2010 | Goto | B23K 11/0026 |
| | | | | 219/117.1 |
| 2011/0180518 A1 | * | 7/2011 | Hasegawa | B23K 11/253 |
| | | | | 219/108 |
| 2011/0233173 A1 | * | 9/2011 | Kaneko | B23K 11/002 |
| | | | | 219/83 |
| 2011/0272384 A1 | * | 11/2011 | Matsushita | B23K 11/115 |
| | | | | 219/91.2 |
| 2012/0067851 A1 | * | 3/2012 | Lee | B23K 11/11 |
| | | | | 219/86.9 |

FOREIGN PATENT DOCUMENTS

| | | |
|---|---|---|
| JP | 2006-181621 | 7/2006 |
| JP | 2011-194465 | 10/2011 |
| JP | 2012-011398 | 1/2012 |

\* cited by examiner

ONE-SIDE RESISTANCE SPOT WELDING METHOD AND APPARATUS FOR CARRYING OUT THE SAME

TECHNICAL FIELD

The present invention relates generally to an improvement in the resistance spot welding technology, and more particularly to a one-side resistance spot welding method and an apparatus for carrying out the one-side resistance spot welding method.

BACKGROUND ART

In a direct spot welding method, one electrode is brought into pressure contact with an upper surface of a top plate, and another electrode vertically aligned with the one electrode is bright into pressure contact with a lower surface of a bottom plate. In cases where an enough space for installation of the electrode is not available below the bottom plate, a one-side spot welding method is preferably employed wherein one electrode and another electrode are disposed on one side of the two plates to be joined. A typical example of such one-side spot welding method is disclosed in Japanese Patent Application Laid-open Publication (JP-A) No. 2006-181621.

FIG. 8 hereof shows the fundamental principle of the conventional one-side resistance spot welding method shown in JP 2006-181621A. As shown in this figure, a top plate 102 is placed on a bottom plate 101, and one electrode 103 and another electrode 104 are brought into contact with an upper surface of the top plate 102 with a predetermined distance held between the two electrodes 103, 104. The one electrode 103 is forced against the top plate 102 under the control of a pressure control unit 105, and the other electrode 104 is forced against the top plate 102 under the control of another pressure control unit 106. While keeping this condition, a current control device 107 operates to cause electric current to flow from the one electrode 103 via the top and bottom plates 102, 101 to the other electrode 104 along a path indicated by the arrows (1), (2) and (3).

During that time, as the electric current flows from the top plate 102 to the bottom plate 101 as indicated by the arrow (1), a so-called resistance heat generation phenomenon occurs at the interface between the top plate 102 and the bottom plate 101 at a position located directly beneath the electrode 103, and the weld is made. As a result, a weld nugget 108 is formed. Similarly, as the electric current flows from the bottom plate 101 to the top plate 102 as indicated by the arrow (3), a resistance heat generation phenomenon occurs at the interfaced between the top plate 102 and the bottom plate 101 at a position directly beneath the electrode 104, and the weld is made with the result that a weld nugget 109 is formed.

During the one-side resistance welding process, part of the electric current flows from the electrode 103 through the top plate 102 to the electrode 104, as denoted by reference numeral 111. This electric current part 111 is called as non-effective shunt current. The greater the amount of non-effective shunt current 111, the smaller the amount of effective current will be and formation of the nuggets 108, 109 becomes insufficient.

It is therefore desirable to reduce the amount of non-effective shunt current that flows from one electrode to another electrode through only one plate with which the electrodes are brought into contact.

SUMMARY OF THE INVENTION

It is, therefore, an object of the present invention to provide a one-side resistance spot welding method which is capable of suppressing generation of non-effective shunt current.

Another object of the present invention is to provide an apparatus for carrying out the one-side resistance spot welding method.

According to a first aspect of the present invention, there is provided a one-side resistance spot welding method comprising the steps in the order named of: providing a first electrode and a second electrode both disposed mutually close to each other on one side of a workpiece composed of at least two superposed steel sheets, the first electrode having a spherical surface at a tip end thereof; bringing the first and second electrodes into pressure contact with a surface of an endmost steel sheet of the at least two superposed steel sheets; feeding an electric current having a current value smaller than a current value of a welding current from the first electrode to the second electrode to preheat the workpiece such that a substantially annular high-temperature region coaxial with the first electrode and having a higher temperature than neighboring parts is created in the workpiece due to resistance heat generation at a position located near the tip end of the first electrode; and feeding the welding current from the first electrode through the workpiece to the second electrode to thereby form a weld nugget at an interface between the endmost steel sheet and the adjacent steel sheet at a position aligned with the second electrode, wherein the annular high-temperature region forms a shielded current path due to its high electric resistance and serves to guide the welding current from the first electrode to flow into the adjacent steel sheet via the shielded current path, thereby allowing the welding current to subsequently advance along the adjacent steel sheet and reach the second electrode via the endmost steel sheet.

In the one-side resistance spot welding method, a substantially annular high-temperature region is formed in the workpiece during the preheating step. The annular high-temperature region is coaxial with the first electrode and located at a position near the tip end of the first electrode. Since the electric resistance of the steel increases in direct proportion to the temperature, the annular high-temperature region forms or defines a shielded current path due to its high electric resistance during the next following welding step. The annular high-temperature region thus forming a shielded current path serves to guide the welding current from the first electrode to flow into the adjacent steel sheet via the shielded current path, thereby allowing the welding current to subsequently advance along the adjacent steel plate and reach the second electrode via the endmost steel sheet. During the welding step, the welding current from the first electrode is substantially prevented from flowing to the second electrode only through the endmost steel sheet. Thus, generation of a non-effective shunt current can be suppressed, and a weld nugget of a desired size can be formed at the interface between the endmost steel sheet and the adjacent steel sheet at a position aligned with the second electrode.

Preferably, the annular high-temperature region extends between the endmost steel sheet and the adjacent steel sheet across the interface between the endmost steel sheet and the adjacent steel sheet. This arrangement ensures reliable guidance of the welding current from the first electrode to the adjacent steel sheet.

In one preferred form of the invention, the annular high-temperature region has a generally hollow circular truncated cone shape widening in a direction axially away from the first electrode, and the annular high-temperature annular region of the hollow circular truncated cone shape has a small-diameter end having an outside diameter substantially equal to a diameter of an outer edge of a contact area between the spherical surface at the tip end of the first electrode and the surface of the endmost steel sheet, and a large-diameter end having an outside diameter substantially equal to an outside diameter of a cylindrical body of the first electrode. This arrangement is particularly effective to guide the welding current from the first electrode to the adjacent steel sheet with enhanced smoothness.

Preferably, the current value of the electric current in the preheating step is 30 to 50% of the current value of the welding current.

Preferably, a pressure exerted from the second electrode onto the surface of the endmost steel sheet is smaller than a pressure exerted from the first electrode onto the surface of the endmost steel sheet.

According to a second aspect of the present invention, there is provided a one-side resistance spot welding apparatus comprising: a frame adapted to be supported in such a manner as to be movable relative to a workpiece composed of at least two superposed steel sheets; a first electrode and a second electrode both disposed mutually close to each other and movably mounted on the frame via a first actuator and a second actuator, respectively, the first and second electrodes being driven by the first and second actuators, respectively, to move into pressure contact with a surface of an endmost steel sheet of the at least two superposed steel sheets, the first electrode having a spherical surface at a tip end thereof; a welding power supply electrically connected with the first and second electrodes for conduction to cause an electric current to flow from the first electrode via the workpiece to the second electrode while the first and second electrodes are brought into pressure contact with the surface of the endmost steel sheet of the at least two superposed steel sheets; and a controller for controlling operation of the welding power supply in such a manner that an electric current having a current value smaller than a current value of a welding current is fed from the first electrode to the second electrode to preheat the work piece such that a substantially annular high-temperature region coaxial with the first electrode and having a higher temperature than neighboring part is created in the workpiece due to resistance heat generation at a position located near the tip end of the first electrode, and subsequently, the welding current is fed from the first electrode through the workpiece to the second electrode to thereby form a weld nugget at an interface between the endmost steel sheet and the adjacent steel sheet at a position aligned with the second electrode wherein the annular high-temperature region forms a shielded current path due to its high electric resistance and serves to guide the welding current from the first electrode to flow into the adjacent steel sheet via the shielded current path, thereby allowing the welding current to subsequently advance along the adjacent steel sheet and reach the second electrode via the endmost steel sheet.

The one-side resistance spot welding apparatus of the foregoing construction is able to achieve the same advantageous effects as those attained by the one-side resistance spot welding method as discussed above. Furthermore, the one-side resistance spot welding apparatus allows for the use of an existing apparatus with a modification of control routines to be achieved by the controller. Substitution by the existing apparatus provides a certain reduction of the equipment cost.

BRIEF DESCRIPTION OF THE DRAWINGS

One preferred structural embodiment of the present invention will be described in detail herein below, by way of example only, with reference to the accompanying sheets of drawings, in which.

DESCRIPTION OF THE PREFERRED EMBODIMENT

Figure 1:
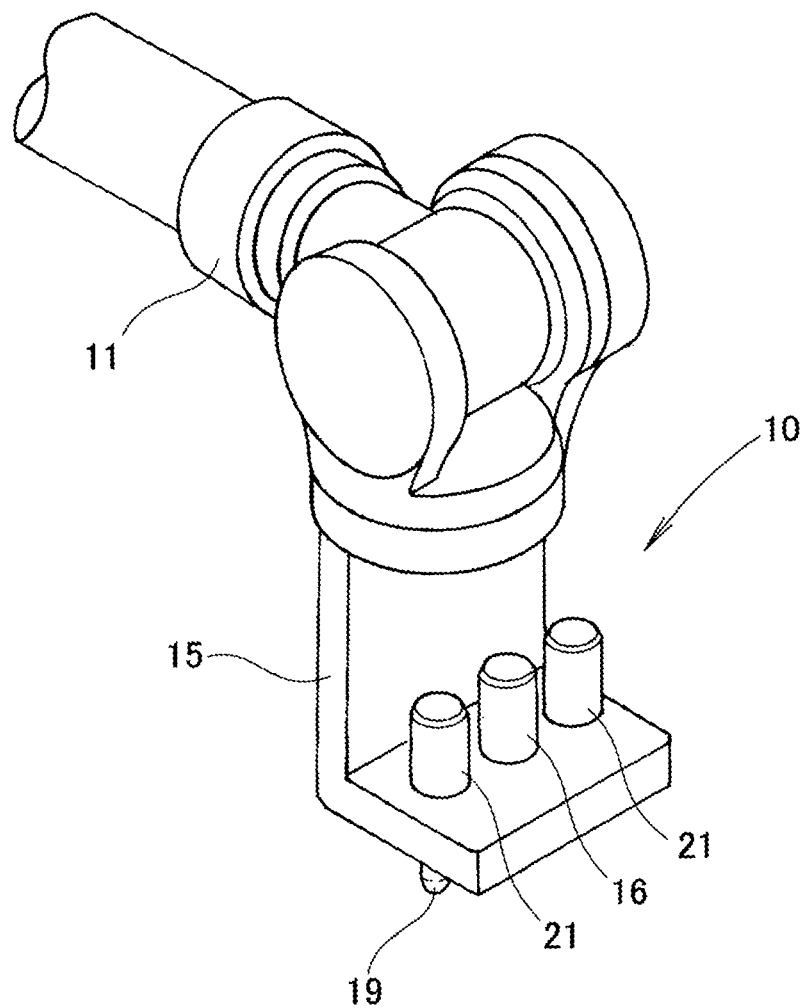
FIG. 1 is a perspective view of a handling means or device equipped with a resistance stop welding apparatus according to the present invention.

Referring now to the drawings and FIG. 1 in particular, there is shown a resistance spot welding apparatus 10 according to the present invention. The resistance spot welding apparatus 10 is incorporated in a handling means or device such as robot 11 and can be moved or manipulated by the robot 11 in an appropriate manner.

Figure 2:
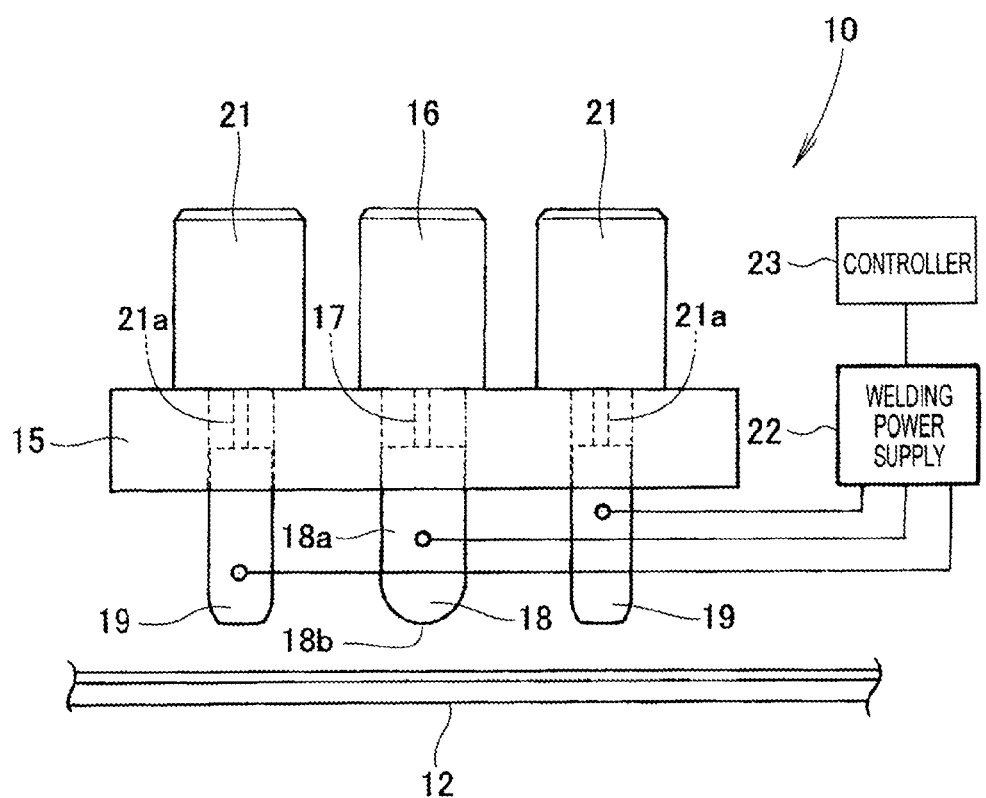
FIG. 2 is a diagrammatical view showing a general configuration of the resistance spot welding apparatus.

As shown in FIG. 2, the resistance spot welding apparatus 10 includes an L-shaped frame 15 connected to a part of the robot 11 (FIG. 1) and adapted to be held horizontally above a workpiece 12, a main actuator (first actuator) 16 mounted on the frame 15 for linearly reciprocating a main electrode (first electrode) 18 toward and away from the workpiece 12, a pair of auxiliary actuators (second actuators) 21, 21 mounted on the frame 15, with the main actuator 16 disposed centrally between the auxiliary actuators 21, 21, for linearly reciprocating a pair of auxiliary electrodes (second electrodes) 19, 19, respectively, toward and away from the workpiece 12, a welding power supply 22 electrically connected with the main and auxiliary electrodes 18, 19, 19, and a control means or controller 23 for controlling operation of the welding power supply 22. The main electrode (first electrode) 18 is connected to a reciprocating rod 17 of the main actuator (first actuator) 16, and the auxiliary electrodes (second electrodes) 19 are connected to reciprocating rods 21a of the respective auxiliary actuators (second actuators) 21.

The main electrode (first electrode) 18 has a cylindrical electrode body 18a and a spherical surface 18b at a tip end (lower end in the illustrated embodiment) of the cylindrical electrode body 18a. The main actuator (first actuator) 16 preferably comprises a cylinder unit provided with a drive source formed by a servo motor. Similarly, the auxiliary actuators (second actuators) 21 preferably comprise a cylinder unit having a drive source formed by a servo motor. The welding power supply 22 is preferably mounted on the frame 15. However, installation position of the welding power supply 22 can be determined arbitrarily.

In the resistance spot welding apparatus 10, the main electrode (first electrode) 18 and the auxiliary electrodes (second electrodes) 19, 19 are disposed on one side of the workpiece 12 and, hence, this welding apparatus is also called as a "one-side resistance spot welding apparatus", which belongs to special spot welding equipment. The one-side resistance spot welding apparatus does not need an earth terminal disposed on a back side (underside in the illustrated embodiment) of the workpiece 12 and is therefore able to provide a high degree of freedom in welding work.

The resistance spot welding apparatus of the foregoing construction will operate as follows.

Figure 3A:
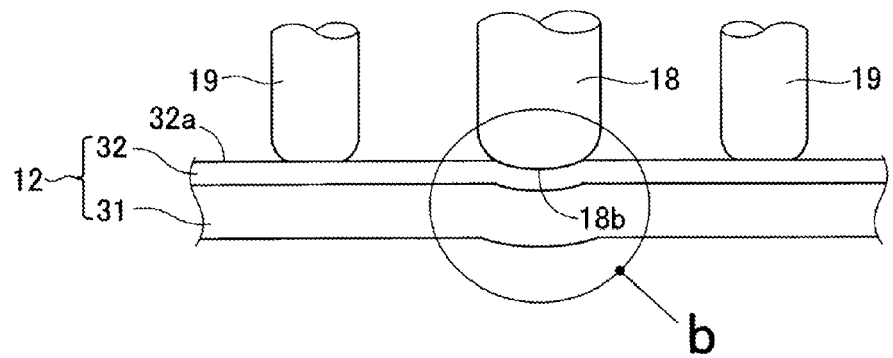
FIGS. 3A through 3C are diagrammatical views illustrative of the operation of the resistance spot welding apparatus.

As shown in FIG. 3A, the workpiece 12 is composed of a first steel sheet 31 and a second steel sheet 32 placed over the first steel sheet 31. The main electrode (first electrode) 18 is brought into pressure contact with an upper surface 32a of the second steel sheet 32, and the auxiliary electrodes (second electrodes) 19, 19 are also brought into pressure contact with the upper surface 32a of the second steel sheet 32. A force or pressure exerted by each of the auxiliary electrodes (second electrodes) 19 is set to be smaller than a force or pressure exerted by the main electrode (first electrode) 18.

Figure 3B:
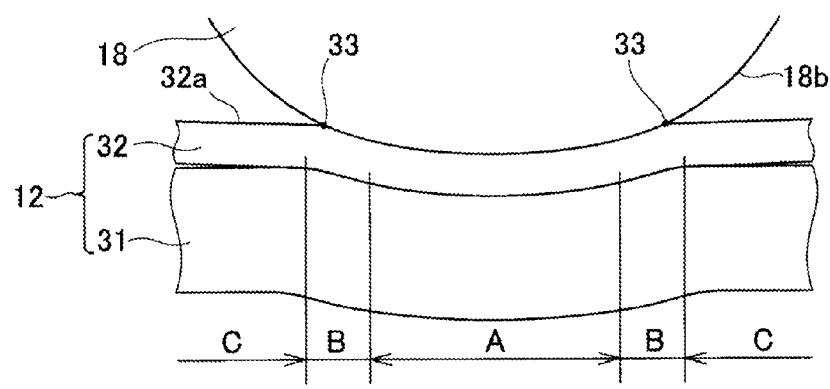

FIG. 3B is an enlarged view of a part "b" shown in FIG. 3A. As shown in FIG. 3B, the first and second steel sheets 31, 32 are locally bent or deformed to become convex downward, and an outer edge of a contact area between the spherical surface 18b at the tip end of the main electrode (first electrode) 18 and the supper surface 32a of the second steel sheet 32 is denoted by reference numeral 33. At a central region A, which is located inwardly of the outer edge 33 of the contact area, the second steel sheet 32 is in close and intimate contact with the first steel sheet 31 so that an electric resistance of the workpiece 12 (FIG. 3A) at this region A is very small. At an outer region C, which is located radially outside the outer edge 33 of the contact area, a small gap is created between the first and second steel sheets 31, 32 so that the conductivity of the workpiece 12 at this area C is not expected. At an intermediate region B, which is located adjacent to the outer edge 33 of the contact area, the workpiece 12 has electric properties which are intermediate between the electric properties at the region A and the electric properties at the region C. Namely, the workpiece 12 at this region B is in contact with the electrode 18 and hence secures a sufficient degree of conductivity. However, the electric resistance of the workpiece 12 at the region B is much higher than that of the workpiece 12 at the region A. This is because, due to the spherical surface 18b at the tip end of the electrode 18, a pressure or force exerted on the workpiece 12 from the electrode 18 becomes small at the region B which is located adjacent to the outer edge 33 of the contact area between the workpiece 12 and the electrode 18.

Figure 4:
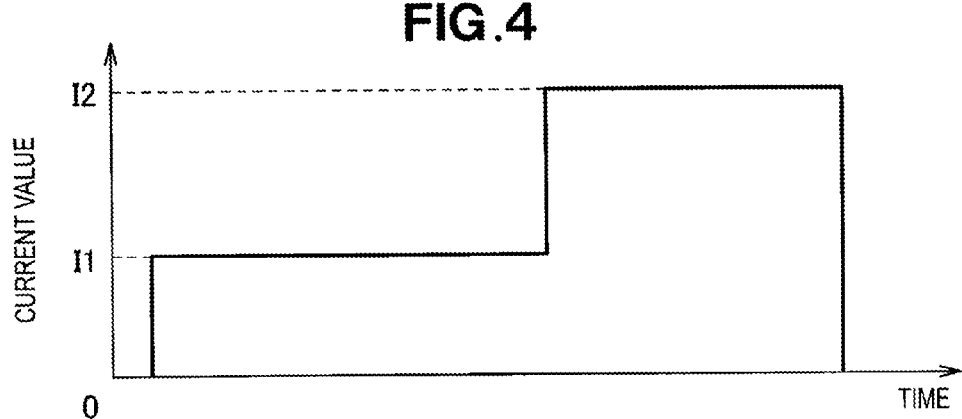
FIG. 4 is a graph showing a current control cycle achieved by a controller of the resistance spot welding apparatus.

The controller 23 shown in FIG. 2 is configured to achieve electric current control during the entire welding process shown in FIG. 4. The controller 23 controls operation of the welding power supply 22 (FIG. 2) in such a manner that during a preheating step, the electric current is kept at a current value I1 which is much smaller than a current value I2 of a welding current supplied during a succeeding welding step. It is preferable that the preheating current value I1 is 30 to 50% of the welding current value I2.

Figure 3C:
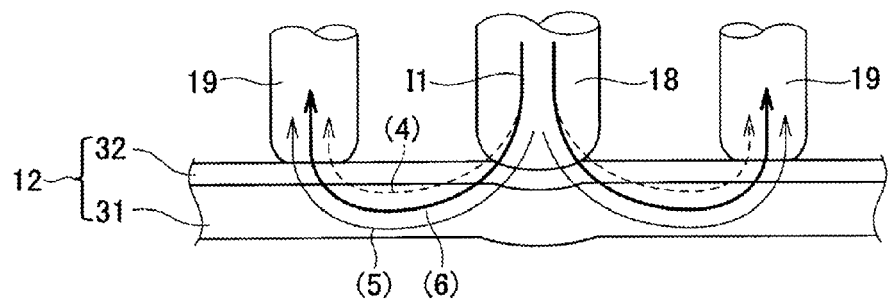

As shown in FIG. 3C, the main electrode (first electrode) 18 and the auxiliary electrodes (second electrodes) 19 are conducted together to cause the electric current I1 to flow from the main electrode (first electrode) 18 to each of the auxiliary electrodes (second electrodes) 19 through the workpiece 12. In this instance, it may be considered that the electric current I1 has a first portion passing mainly through the second steel plate 32 as indicated by dotted lines (4) shown in FIG. 3C, a second portion passing mainly through the first steel plate 31 as indicated by solid lines (5) shown in FIG. 3C, and a third portion intermediate between the first and second part as it passes through both the first and second steel sheets 31, 32 as indicated by thick solid lines (6) shown in FIG. 3C.

As previously described, the conductivity of the workpiece 12 is poor at the region C and the electric current I1 flows very little in the workpiece 12 at this region C. The electric current I1 flows in the workpiece 12 at the regions A and B. As the electric current I1 flows through the workpiece 12, Joule heat is generated to an amount which can be represented by expression $Q=I^2Rt$, where Q is the amount of heat, I is the current value, R is the resistance value, and t is the time. At the region B, the workpiece 12 has a resistance value much greater than that of the workpiece 12 at the region A, the amount of Joule heat generated at the region B is much greater than that of the region A.

Figure 5:
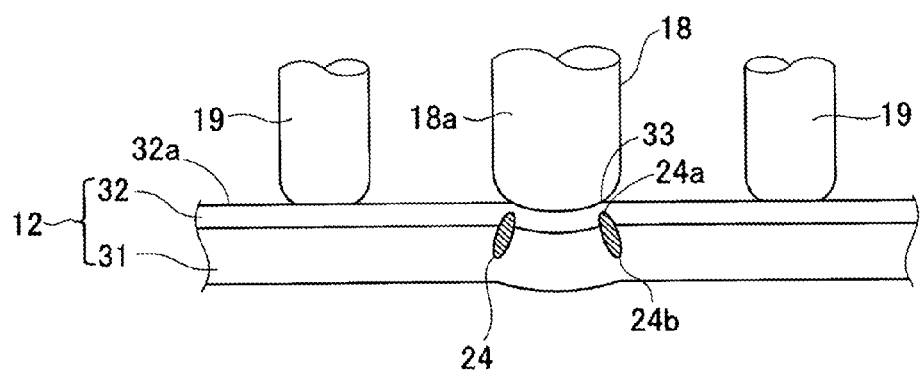
FIG. 5 is a diagrammatical view showing a preheating step in which an annular high-temperature region is created according to a resistance spot welding method of the present invention.

As a result, an annular high temperature region 24 is created in the workpiece 24 as shown in FIG. 5. The annular high temperature region 24 is coaxial with the main electrode (first electrode) 18, has a higher temperature higher than neighboring parts, and is located near the tip end of the main electrode (first electrode) 18. The annular high-temperature region 24 has a generally hollow circular truncated cone shape widening in a direction axially away from the main electrode (first electrode) 18. The annular high temperature region 24 of the hollow circular truncated cone shape extends between the first and second steel plates 31, 32 across an interface between the first and second steel sheets 31, 32. Furthermore, the annular high temperature region 24 of the hollow circular truncated cone shape has a small-diameter end 24a having an outside diameter substantially equal to a diameter of the outer edge 33 of the contact area between the spherical surface 18b at the tip end of the main electrode 18 and the upper surface 32a of the second steel sheet 32, and a large-diameter end 24b having an outside diameter substantially equal to an outside diameter of the cylindrical body 18a of the main electrode 18.

Figure 6:
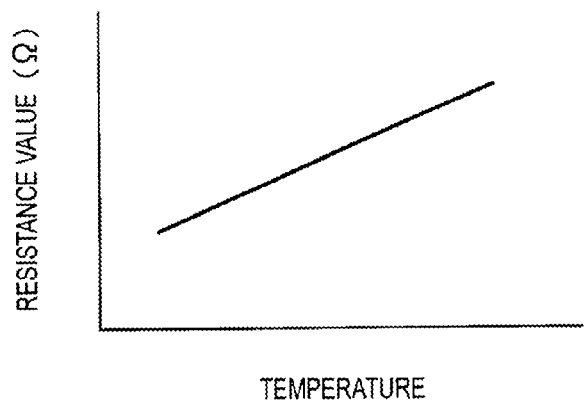
FIG. 6 is a graph showing the relationship between the resistance value and the temperature.
Figure 7:
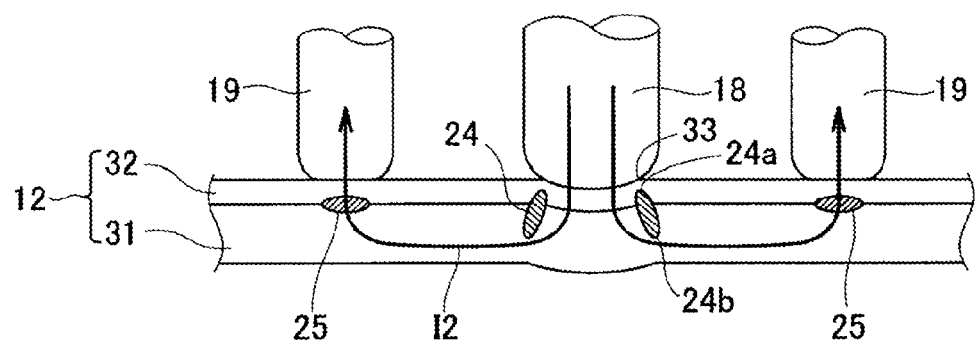
FIG. 7 is a diagrammatical view showing a welding step according to the resistance spot welding method of the present invention.
Figure 8:
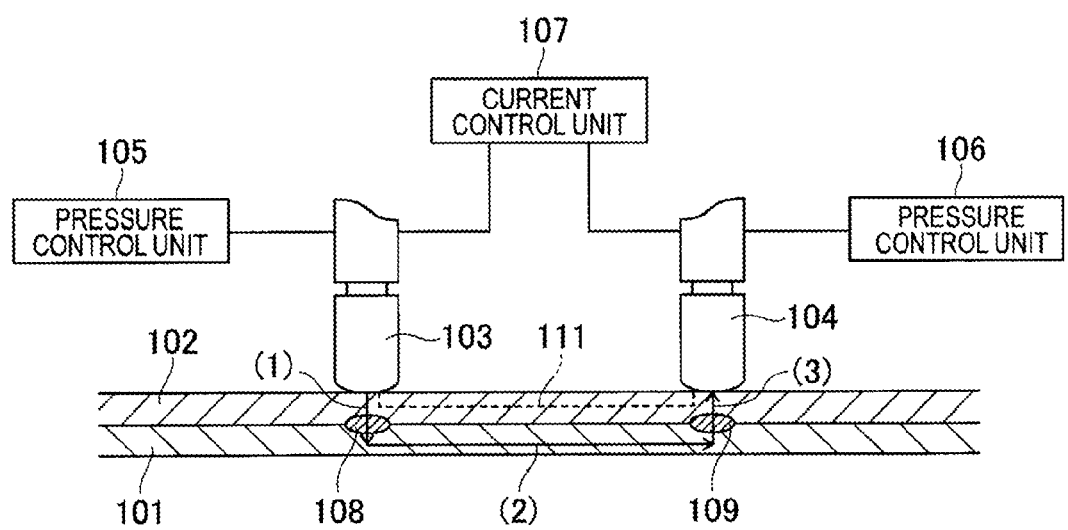
FIG. 8 is a diagrammatical view showing the fundamental principle of a conventional one-side resistance spot welding method.

As shown in FIG. 6, the resistance of the steel sheets increases in proportion to the temperature. Then, the controller 23 controls the welding power supply 22 to switch the electric current value from the preheating current value I1 to the welding current value I2 shown in FIG. 4. This will cause the welding current I2 to flow from the main electrode 18 to each of the auxiliary electrodes 19 via the workpiece 12, as shown in FIG. 7. In this instance, the annular high temperature region 24 forms a shield against permeation of current flow due to its very high electric resistance value. With the shied (annular high temperature region) 24 thus formed, the welding current I2 from the main electrode 18 is substantially blocked from flowing along the second steel sheet 32 as it flows toward the auxiliary electrodes 19. Rather, most of the welding current I2 from the main electrode 18 flows into the first steel sheet 31 via a shielded current path defined by the annular high temperature region 24, then advances along the first steel sheet 31 and finally reaches the auxiliary electrodes 19 via the second steel sheet 32. The annular high temperature region 24 thus forming the shielded current path serves to guide the welding current I2 from the main electrode (first electrode) 18 into the first steel sheet 31 via the shielded current path, so that the welding current I2 from the main electrode (first electrode) 18 is prevented from flowing to the auxiliary electrodes (second electrodes) 19 only through the second steel sheet 32. Generation of non-effective shunt current can thus be prevented.

As a result, weld nuggets 25, 25 of a desired size are formed at the interface between the first and second steel sheets 31, 32 at positions located directly beneath the auxiliary electrodes (second electrodes) 19, 19. Though not shown, a similar weld nugget may be formed at the interface between the first and second steel sheets 31, 32 at a position directly beneath the main electrode (first electrode) 18.

It will be appreciated from the foregoing description that the resistance spot welding method of the present invention generally comprises a preheating step (for forming an annular high-temperature region 24) and a welding step (for forming the weld nuggets 25, 25). As previously described with reference to FIG. 2, the main electrode (first electrode) 18 used in the illustrated embodiment has a cylindrical body 18a having a spherical surface 18b at a tip end thereof. In the preheating step, the electric current having a current value I1, which is smaller than a current value I2 of the welding current in the welding step, is caused to flow from the main electrode 18 to each of the auxiliary electrodes 19, as shown in FIG. 3C, and due to resistance heat generation, an annular high-temperature region 24 coaxial with the main electrode (first electrode) 18 and having a higher temperature than neighboring parts is created in the workpiece 12 at a position located near the tip end of the main electrode (first electrode) 18. The annular high temperature region 24 has a generally hollow circular truncated cone shape widening in a direction axially away from the main electrode 18. The annular high temperature region 24 of the circular truncated cone shaped has a small-diameter end 24a having an outside diameter substantially equal to a diameter of the outer edge 33 of the contact area between the spherical surface 18b at the tip end of the main electrode (first electrode) 18 and the upper surface 32a of the second steel sheet 32, and a large-diameter end 24b having an outside diameter substantially equal to a diameter of the cylindrical body 18a of the main electrode 18.

Then, the welding step is performed wherein the electric current having a current value I2 (welding current to cause melting of material of the steel sheets 31, 32 to be joined) is caused to flow from the main electrode 18 to the auxiliary electrodes 19 via the workpiece 12 so that weld nuggets 25, 25 are formed at the interface between the first and second steel sheet 31, 32 at positions located beneath the auxiliary electrodes (second electrodes) 19, as shown in FIG. 7. During the welding step, the annular high-temperature zone 24 forms a shielded current path due to its high electric resistance and serves to guide the welding current I2 from the main electrode (first electrode) 18 to flow into the first steel sheet 31 via the shielded current path, so that the welding current from the main electrode (first electrode) 18 is prevented from flowing toward the auxiliary electrodes (second electrodes) 19 via the second steel sheet 32. Thus, generation of a non-effective shunt current can be avoided.

The foregoing resistance spot welding method is carried out by the resistance spot welding apparatus 10 shown in FIG. 2. The resistance spot welding apparatus 10 is of the type designed for general-purpose use, which can readily be applied in the resistance spot welding method of the present invention merely with a modification made in control routines to be executed by the controller 23. This means that the resistance spot welding apparatus 10 may be substituted by any existing apparatus and does not increase the equipment cost.

Although in the illustrated embodiment, two steel sheets 31, 32 are superposed, three or more steel sheets can be placed one over another. Furthermore, two auxiliary electrodes (second electrodes) 19 are used in the illustrated embodiment, however, only one auxiliary electrode (second electrode) or three or more auxiliary electrodes (second electrodes) can be used according to the invention.

Although in the illustrated embodiment, the second steel sheet 32 is placed over the first steel sheet 31, the first steel sheet 31 may be placed over the second steel sheet 32. Furthermore, in the illustrated embodiment, the steel sheets 31, 32 to be joined are disposed in a horizontal plane, however, the steel sheets 31, 32 may be disposed in either a vertical plane or an inclined plane. Regardless of the orientation of the steel sheets 31, 32 to be joined, the main electrode (first electrode) 18 and the auxiliary electrodes (second electrodes) 19 are disposed on one side of the workpiece 12 composed of at least two superposed steel sheets 31, 32 and they are arranged to reciprocate toward and away from the steel sheets 31, 32 in a direction perpendicular to a plane in which the steel sheets 31, 32 is disposed.

INDUSTRIAL APPLICABILITY

The present invention is particularly suitable for use in a technology for joining two or more steel sheets together by a one-side resistance spot welding method.

What is claimed is:

1. A one-side resistance spot welding method comprising the steps in the order named of:

providing a first electrode and a pair of second electrodes arranged across the first electrode, the first electrode and the pair of second electrodes being disposed mutually close to each other on one side of a workpiece composed of at least two superposed steel sheets, the first electrode having a spherical surface at a tip end thereof;

bringing the first electrode and the pair of second electrodes into pressure contact with a surface of an endmost steel sheet of the at least two superposed steel sheets;

feeding an electric current having a current value smaller than a current value of a welding current from the first electrode to the pair of second electrodes in a branched manner to preheat the workpiece such that an annular high-temperature region coaxial with the first electrode and having a higher temperature than neighboring parts is created in the workpiece due to resistance heat generation at a position located near the tip end of the first electrode; and feeding the welding current in another branched manner from the first electrode through the workpiece to the pair of second electrodes to thereby form weld nuggets at an interface between the endmost steel sheet and an adjacent steel sheet at positions aligned with the pair of second electrodes, wherein the annular high-temperature region forms a shielded current path due to its high electric resistance and serves to guide the welding current from the first electrode to flow into the adjacent steel sheet via the shielded current path, thereby allowing the welding current to subsequently advance along the adjacent steel sheet and reach the pair of second electrodes via the endmost steel sheet, wherein the electric current is switched to the current value of the welding current from the current value smaller than the current value of the welding current while a resistance value of the workpiece is increased.

2. The one-side resistance spot welding method according to claim 1, wherein the annular high-temperature region extends between the endmost steel sheet and the adjacent steel sheet across the interface between the endmost steel sheet and the adjacent steel sheet.

3. The one-side resistance spot welding method according to claim 2, wherein the annular high-temperature region has a generally hollow circular truncated cone shape widening in a direction axially away from the first electrode, and the annular high-temperature annular region of the hollow circular truncated cone shape has a small-diameter end having an outside diameter substantially equal to a diameter of an outer edge of a contact area between the spherical surface at the tip end of the first electrode and the surface of the endmost steel sheet, and a large-diameter end having an outside diameter substantially equal to an outside diameter of a cylindrical body of the first electrode.

4. The one-side resistance spot welding method according to claim 1, wherein the current value of the electric current in the preheating step is 30 to 50% of a current value of the welding current.

5. The one-side resistance spot welding method according to claim 1, wherein a pressure exerted from the pair of second electrode onto the surface of the endmost steel sheet is smaller than a pressure exerted from the first electrode onto the surface of the endmost steel sheet.

* * * * *